United States Patent [19]
Overbury

[11] 3,936,829
[45] Feb. 3, 1976

[54] METHOD OF RADIO NAVIGATION
[75] Inventor: Francis G. Overbury, Washington, D.C.
[73] Assignee: International Standard Electric Corporation, New York, N.Y.
[22] Filed: Dec. 5, 1974
[21] Appl. No.: 529,989

[30] Foreign Application Priority Data
Dec. 6, 1973 United Kingdom............... 56513/73

[52] U.S. Cl....... 343/106 R; 343/106 D; 343/112 R; 343/113 R
[51] Int. Cl.²........................................... G01S 1/38
[58] Field of Search............ 343/106, 106 D, 112 R, 343/113 R

[56] References Cited
UNITED STATES PATENTS

| | | | |
|---|---|---|---|
| 2,546,970 | 4/1951 | Busignies | 343/106 R |
| 2,939,136 | 5/1960 | Icenbice, Jr. | 343/106 R |
| 2,971,190 | 2/1961 | Busignies | 343/112 R |

*Primary Examiner*—T. H. Tubbesing
*Assistant Examiner*—Richard E. Berger
*Attorney, Agent, or Firm*—W. T. O'Neil

[57] ABSTRACT

A method of determining, at the site of a radio beacon, the location of any beacon signal reflecting objects, in which method the beacon is caused to transmit a directionally coded signal over a given service sector, in which during said signal transmission a radio receiver is moved towards said beacon along a predetermined path in said sector, in which during said movement all beacon-derived signals received by the receiver are recorded in a form such as to be coded at least in respect of beacon related bearings and in which said recorded signals are individually isolated in such a manner as to permit identification and location of any of said reflecting objects.

6 Claims, 12 Drawing Figures

MULTIPATH SIGNAL $f_2$ CORRESPONDS TO $\phi_2$ — DIRECT SIGNAL $f_1$ CORRESPONDS TO DIRECTION $\phi_1$ FROM FILTER $f_1$ FROM FILTER $f_2$ $f_2 - f_1$ = SEPARATION ANGLE DOUBLET SPACING = $f$ SCALLOP — $\frac{n}{T_s}$ VERY NARROW FILTER AROUND LINE DOUBLET  $f_2 - f_1$

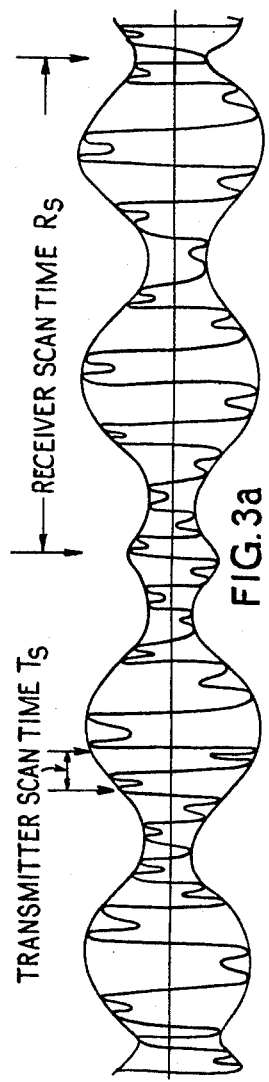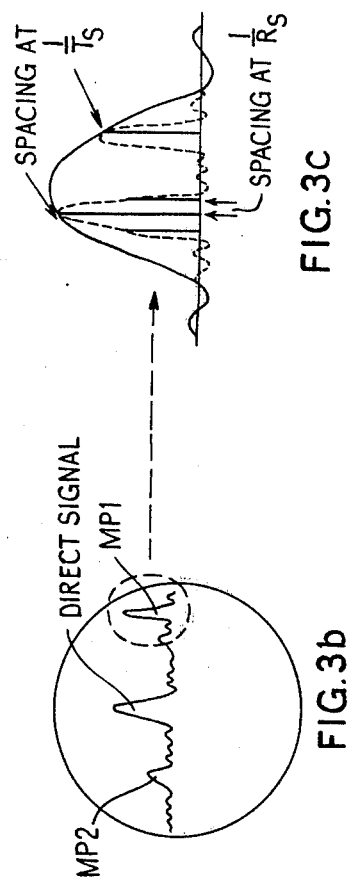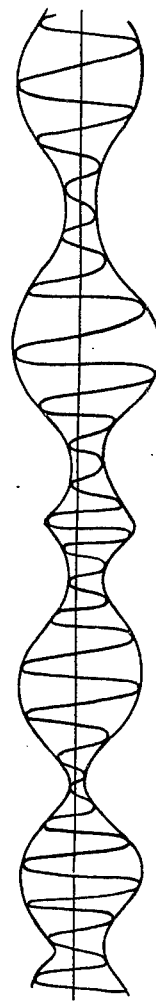
FIG. 3a FIG. 3b FIG. 3c FIG. 3d

METHOD OF RADIO NAVIGATION

This invention relates to radio navigation, with particular reference to determining multipath propagation characteristics associated with a radio navigation beacon at any given site thereof, such multipath propagation arising from beacon signal reflecting objects at or in the vicinity of the site, or intended site.

One of the most significant characteristics of a microwave instrument landing system is its performance in the presence of multipath propagation, as multipath signals constitute a major potential source of error in such systems. It is therefore desirable to be able to amass knowledge of the amplitude and position of the reflecting objects responsible for errors attributable to multipath propagation. In general this information is particularly important when attempting to predict the performance of an individual system with reference to the theoretical capability of its processing circuits. In particular such knowledge is important to the design of acquisition and verification circuits and to the degree of complexity which must be adopted in the processor itself.

According to the invention there is provided a method of determining, at the site of a radio beacon, the location of any beacon signal reflecting objects, in which method the beacon is caused to transmit a directionally coded signal over a given service sector, in which during said signal transmission a radio receiver is moved towards said beacon along a predetermined path in said sector, in which during said movement all beacon-derived signals received by the receiver are recorded in a form such as to be coded at least in respect of beacon related bearings and in which said recorded signals are individually isolated in such a manner as to permit identification and location of any of said reflecting objects.

The invention will now be more particularly described with reference to the accompanying drawings, in which:

FIGS. 3a–3d show a series of waveforms for illustrating another method of bearing determination of reflecting objects.

Figure 1:
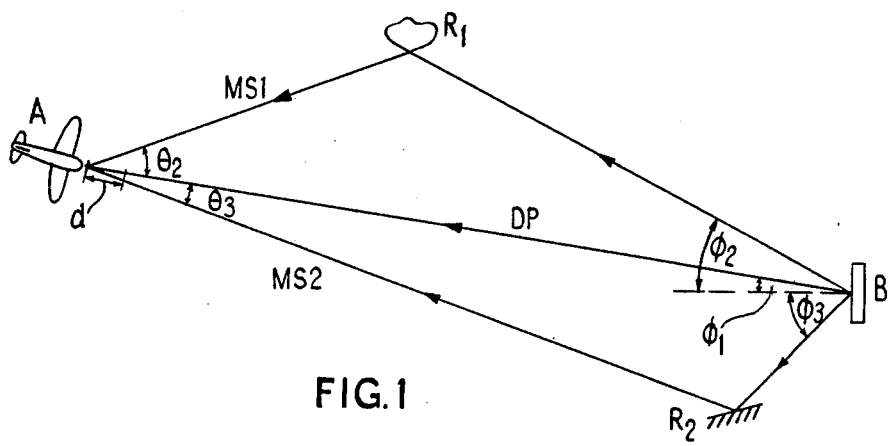
FIG. 1 shows an aircraft flying towards a radio navigation beacon along a perdetermined path.

Referring to FIG. 1, an aircraft A is flown towards a radio navigation beacon B, the aircraft being equipped with a suitable radio navigation receiver responsive to signals via direct path DP to maintain the aircraft on a calibrating path at an angle $\phi_1$. It is here assumed that there are two reflecting objects R1 and R2, each causing multipath signals MS1 and MS2 also to be received by the aircraft.

In general, with transmission being made from a representative point, for example on an airfield surface, with azimuth directional coding impressed on it, for example by the Doppler technique, it is possible to decode the received signals at a given point in terms of a series of responses of measurable amplitude and each response carries a code indicating the direction of the reflecting object (angles $\phi_2$ and $\phi_3$) from which they were derived with respect to the transmitter. With further coding applied at the receiver, for example in terms of bearing with respect to aircraft heading, providing this second coding (angles $\theta_2$ and $\theta_3$) is linked with each response previously coded with transmitter dependent bearing, then it is possible to position the origin of each detectable multipath source.

Directivity at the transmitter can be directly supplied if measurements are being carried out where there is already a Doppler installation.

When it is desired to examine a site, other than where there is already a transmitter installation, a portable system may be used. Such a transmitter may be simply designed, operating as described for example in British Pat. No. 1,234,541 and consisting of a linear array of antennas and a reference antenna bearing in mind that much reduced angular resolution would be satisfactory for adequate reflector identification. A suggested configuration for the array is of 16 antennas ½-wavelength spaced giving a 7° beam resolvable to ¼-beamwidth (2°). The length of such an array is under 2 ft. at C band. The limited number of array elements used permits the use of high scan rates (e.g., 5 – 10 kHz) with consequent faster read out scan speed.

The investigating aircraft carries a recorder, e.g., a tape recorder, capable of handling the Doppler spectrum associated with the azimuth sector under investigation. Recording is made of information signals after sector filtering but before further processing, in which case a complete record of wanted, i.e., direct path, and unwanted, i.e., multipath, signal components, their relative amplitude and transmitter related bearings, will be obtained in terms of the recorded spectral groupings. In some cases where higher scan rates are used it may be necessary to interface a frequency changer between receiver and recorder to bring all information ranges to a 0 – 50 kHz band.

The use of a spectrum analyser will provide a panoramic presentation of results, the horizontal axis of frequency representing angular positioning of sources with respect to the transmitter and relative amplitude of responses giving a direct relationship between direct signal and multipath signal components.

In general spectrum analyser scan times will be consistent with the identification of short duration multipath phenomena on a "surveillance" basis. By this is meant that a 1 sec. scan rate will permit the resolution of important multipath contributions which are maintained for this duration. More detailed examination of phenomena observed on this basis may be carried out by cutting out specific parts of the tape and playing them as a loop using slower (spectrum analyser) scan rates. As a guide, the time taken by a scanning spectrum analyser to resolve a given azimuth sector (say ± 60°) into $n$ parts (120°/n) is given by the Doppler scan time $Ts \times n$.

Some assistance in establishing reflection geometry may be derived from the measurement of "scallop" rate of individual reflection components, "scallop" being change of differential path length between direct and indirect signals, though there may still be residual ambiguities and these may have to be resolved by the use of a second flight along a different approach path. However no directive elements have to be fitted to the aircraft.

In order to deduce the angular position of a reflecting source, e.g., R1 at angle $\theta_2$, by using the scallop rate in conjunction with knowledge of aircraft speed, $V$; for a small distance d of aircraft movement towards the transmitter, multipath length decreases by $d \cos \theta_2$. Path difference change is $$\frac{d(1-\cos\Theta_2)}{\lambda}\text{Wavelengths}$$

$$\text{Scallop rate} = \frac{V(1-\cos\Theta_2)}{\lambda}$$

$$\therefore \cos\Theta_2 = 1 - \frac{\text{Scallop rate}.\lambda}{V.}$$

Figure 2A:
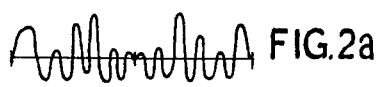
FIGS. 2a–2g show a series of waveforms for illustrating one method of bearing determination of reflecting objects.
Figure 2B:
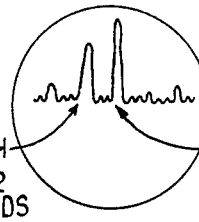

As derived from the received wideband information signal, FIG. 2a containing components at frequency $f_1$ (wanted signal), $f_2$ (multipath via R1), etc., individual multipath responses identified in the general surveillance scan of the spectrum analyser, FIG. 2b may be isolated by manual selection and their scallop rates measured for individual position fixing.

Figure 2C:
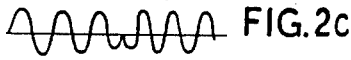
Figure 2D:
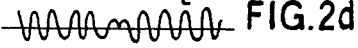
Figure 2E:
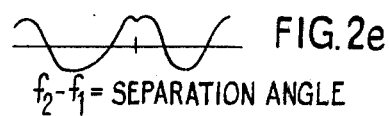
Figure 2G:
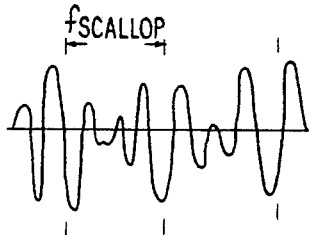
Figure 2F:
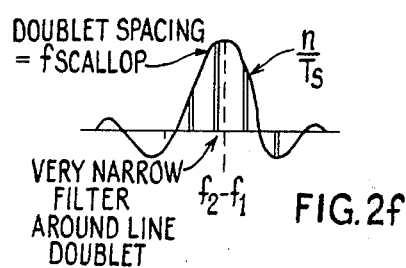

The method is based on isolation by variable filter of direct signal, FIG. 2c, and particular multipath signal, FIG. 2d. The subsequent mixing of these two components, FIG. 2e, will produce "Doppler type" packets terminated by the normal phase transients at scan rate. The frequency contained by these packets represents the angular separation (w.r.t. the transmitter) of direct and multipath ray. The starting phase of individual packets is determined by the differential path length of direct and indirect path. Hence change of this differential path length will produce cyclic change of the initial phase in exactly the same way as digitization does of the main Doppler signal. The periodicity of this change is equal to the scallop rate and may be measured by determining the separation of the two components of the line doublets which form the spectrum of the beat envelope, FIG. 2f. This is done in an appropriate filter, FIG. 2g.

Certain ambiguities arise when scallop rate becomes comparable with the Doppler scan rate. This effect is eliminated by the use of high Doppler scan rates which could be easily achieved in a short array portable transmitter.

For airborne directivity to be achieved some baseline must be established. In the scallop count method described above, synthetic baseline in a fore and aft direction is created by aircraft movement. An actual baseline is established by fitting the aircraft with an antenna array of finite horizontal dimensions, say 6 wavelengths, 10°, 1¼ feet at 5 GHz.

The requirement of the method is that dual coding (transmitter derived and receiver derived) be maintained on the airborne recording. The two codes must therefore be separable and non-interfering over the sectors required.

Airborne direction defining may be by amplitude scan. In this method the airborne antenna is caused to generate a swept amplitude pattern by means of a phase shifter at the antenna. Direction of beam maximum is correlated with a suitable code which is recorded along with the Doppler spectrum indicating transmitter bearing.

When it is desired to know the aircraft/reflector angle of a particular multipath which has been observed on the panoramic display of responses defined in terms of transmitter/reflector angle, a filter is manually moved to cover the required multipath response. As amplitude modulation will have been impressed on the response under investigation, the time of maximum output from each particular response may be related to the directional code as an indication of received directions. In this process care has to be taken that scan dwell times are adequate for correct operation of the spectrum analyser for the surveillance presentation. An omnidirectional mode time shared with a directional mode would ease this problem.

Airborne direction finding may alternatively be by Doppler scan. The use of a further Doppler scan at the receiver relieves the problem of restricted dwell times upsetting the panoramic display.

A short scanned array and reference antenna at the aircraft will impress a further Doppler derived component on the received signals, FIG. 3a. A wide difference in the choice of scan rate will ensure simple separation of the two required bearing components. Rapid scanning, for example, at the transmitter will generate a high frequency beat envelope on all received components. A further Doppler scan, this time at a slow rate will generate a low frequency component on all components of the received wave.

Again, particular multipath components, e.g., MP1, on the panoramic display, FIG. 3b, may be separated by variable filter, FIG. 3c and a narrow filter placed over secondary spectrum generated by receiver scan. The received directional information appears as envelope modulation on the signals, FIG. 3d. Envelope detection and count or period count indicates angle ($\theta_2$) with respect to the receiver.

This technique is in principle applicable to the transmission from a standard azimuth Doppler transmitter though slow scan rates would have to be used at the airborne unit to avoid the spacing of sideband components impressed by the airborne unit on the spectral line components of the ground transmission becoming comparable with their separation (Airborne Doppler shift must be less than scan rate of the transmitter system).

An airborne installation as described above may be operated with a suitably designed portable ground installation of short baseline and high scan rate. The portability feature would permit rapid mapping of different sites on the same or other airfields.

The above described method and associated techniques are applicable at all frequencies where multipath source distribution is required to be known.

The feature of portability of a direction coded transmitter can easily be maintained down to UHF glide path frequencies, and if necessary to the VHF range, where a 5 wavelength array would have a span of about 45 feet and adequate accuracy could be obtained by individually siting 10 portable elements.

It is to be understood that the foregoing description of specific examples of this invention is made by way of example only and is not to be considered as a limitation on its scope.

I claim:

1. A method of determining, at the site of a radio beacon, the location of any beacon signal reflecting objects, in which method the beacon is caused to transmit a directionally coded signal over a given service sector, in which during said signal transmission a radio receiver is moved towards said beacon along a predetermined path in said sector, in which during said movement all beacon-derived signals received by the receiver are recorded in a form such as to be coded at least in respect of beacon related bearings and receiver related bearings, and in which said recorded signals are individually isolated in such a manner as to permit identification and location of any of said reflecting objects.

2. A method as claimed in claim 1 in which the transmitted signal is directionally coded in terms of frequency and is transmitted by a Doppler radio beacon.

3. A method as claimed in claim 2 in which the recorded signals are individually identified in respect of frequency and amplitude from a panoramic display of the recorded signals on a spectrum analyser.

4. A method as claimed in claim 3 in which the receiver related bearing of an identified reflection signal is derived by measuring the rate of change of differential path length between the identified direct path signal and the reflected signal.

5. A method as claimed in claim 3 in which, prior to recording the received signals, a swept amplitude modulation pattern is impressed thereon such that on identification of a recorded reflection signal the time of maximum output thereof is indicative of the receiver related bearing of the object reflecting the beacon transmitted signal.

6. A method as claimed in claim 3 in which, prior to recording the received signals, there is impressed thereon a Doppler frequency shift of a magnitude determined by the angle of reception of a given component of the received signal, and on identification of a recorded reflection signal the receiver Doppler shifted component thereof is indicative of the receiver related bearing of the object reflecting the beacon transmitted signal.

* * * * *